(12) United States Patent
Kahrs et al.

(10) Patent No.: US 6,227,099 B1
(45) Date of Patent: May 8, 2001

(54) POWER BRAKE FOR MOTOR VEHICLES

(75) Inventors: Manfred Kahrs, Wiesbaden; Alfred Eckert, Bodenheim; Thomas Berthold, Darmstadt; Michael Vogt, Simmern; Christof Klesen, Modautal, all of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/091,790
(22) PCT Filed: Nov. 29, 1996
(86) PCT No.: PCT/EP96/05285
§ 371 Date: Jan. 15, 1999
§ 102(e) Date: Jan. 15, 1999
(87) PCT Pub. No.: WO97/23374
PCT Pub. Date: Jul. 3, 1997

(30) Foreign Application Priority Data

Dec. 23, 1995 (DE) ............................................. 195 48 705

(51) Int. Cl.[7] ....................................................... F15B 9/09
(52) U.S. Cl. ............................................. 91/367; 91/376 R
(58) Field of Search ................................... 91/367, 376 R

(56) References Cited

U.S. PATENT DOCUMENTS 2,807,239 * 9/1957 Grant ................................... 91/369.2
5,355,771 10/1994 Watanabe .
5,460,074 * 10/1995 Balz et al. .......................... 91/376 R

FOREIGN PATENT DOCUMENTS

| 4324205 | 1/1995 | (DE) . |
| 4324688 | 1/1995 | (DE) . |
| 668201 | 8/1995 | (EP) . |
| 2216970 | 10/1989 | (GB) . |
| WO94/11226 | 5/1994 | (WO) . |

* cited by examiner

Primary Examiner—F. Daniel Lopez
(74) Attorney, Agent, or Firm—Rader, Fishman & Grauer PLLC

(57) ABSTRACT

A brake power assist unit for motor vehicles, the control valve of which can be electrically actuated by means of an electromagnet which actuates a third sealing seat that allows ventilation of the operating chamber. In order to stabilize the characteristic of the load system formed by the armature of the electromagnet, a sleeve that carries the third sealing seat and the valve body of the control valve by means of constructive modifications of the control valve of the externally actuated brake power assist unit, in particular, during the pressure reduction phase, the invention proposes means that allow a controlled pneumatic pressure compensation between the operating chamber and the vacuum chamber or a reduction in the force to be generated by the electromagnet during the pressure reduction phase, i.e., during the return movement of the third sealing seat from the valve body.

6 Claims, 5 Drawing Sheets

POWER BRAKE FOR MOTOR VEHICLES

TECHNICAL FIELD

The invention pertains to a pneumatic brake power assist unit for motor vehicles, and more particularly relates to pneumatic brake power assist units which are electrically actuatable.

BACKGROUND OF THE INVENTION

Such a brake power assist unit and its respective application in regulating the brake pressure is known from DE 4,324,205 A1. In this case, the position of a sleeve is controlled by means of a position regulator that receives signals from a displacement transducer and prevents an excessive destabilization of the load characteristic by controlling the current delivered to the electromagnet in such a way that a stable position of the sleeve is attained. In this brake power assist unit, a pressure regulator is connected in series with the position regulator, wherein the output signal of the pressure regulator corresponds to a nominal value position for the ancillary position regulator.

The present invention is based on the objective of proposing measures which allow a stabilization of the load characteristic during the pressure reduction phase due to constructive modifications on the control valve of the brake power assist unit that can be externally controlled. The invention, in particular, aims to eliminate the need for the aforementioned costly position regulator as well as the sensor arrangement.

According to the invention, this objective is attained by providing means that allow a controlled pneumatic pressure compensation between the operating chamber and the vacuum chamber or a reduction of the force to be generated by the electromagnet during the pressure reduction phase, i.e., during the return movement of the third sealing seat from the valve body.

According to one advantageous additional refinement of the invention, a ring that is arranged such that it can be moved relative to the third sealing seat is supported on the sleeve by way of an elastic or compressible element, wherein the edge region of the ring which faces the valve body is provided with openings and arranged axially offset relative to the third sealing seat, namely toward the valve body, in the separated position.

In another advantageous embodiment of the invention, the valve body is provided with an additional annular surface that contains radial openings within the region in which it contacts the third sealing seat.

In another alternative embodiment, the third sealing seat is provided with axial recesses or depressions that, for example, may be realized in the form of a corrugated sealing edge.

DETAILED DESCRIPTION OF THE PREFERRED EMBODIMENTS

Figure 1:
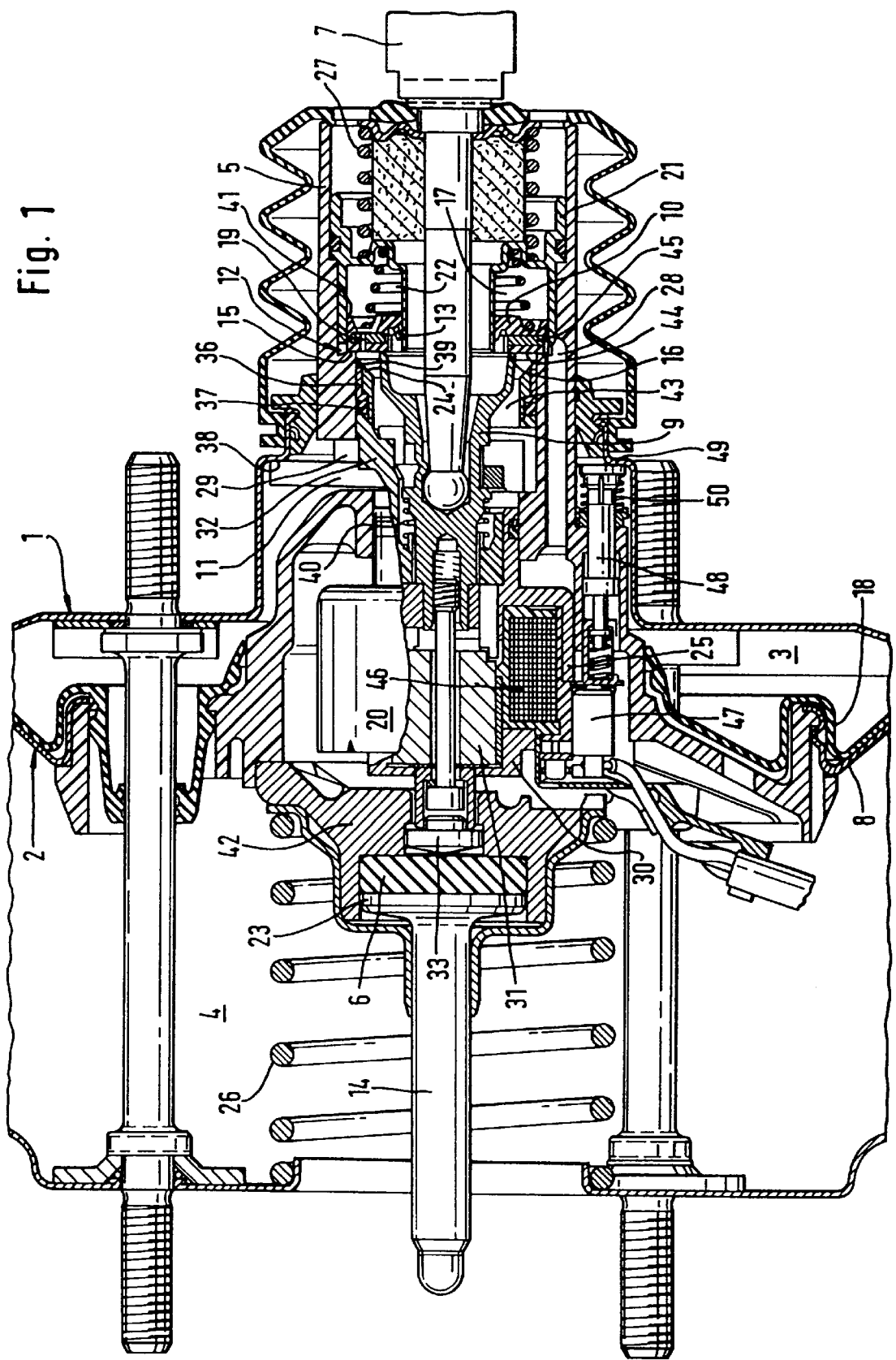
FIG. 1, a partial longitudinal section through one embodiment of the brake power assist unit according to the invention in the inactive standby position 7.

The schematically indicated power assist unit housing 1 of the vacuum brake power assist unit according to the invention is divided into an operating chamber 3 and a vacuum chamber 4 by means of an axially movable wall 2. The axially movable wall 2 consists of a diaphragm disk 8 that is deep-drawn from sheet metal and an adjacent flexible diaphragm 18 that forms a seal in the form of a roller diaphragm between the outer circumference of the diaphragm disk 8 and the power assist unit housing 1.

A control valve 12 that can be actuated by means of an actuating rod 7 is accommodated in a control housing 5 that carries the movable wall 2 and is guided in the power assist unit housing 1 in sealed fashion. This control valve consists of a first sealing seat 15 arranged on the control housing 5, a second sealing seat 16 arranged on a valve piston 9 that is connected to the actuating rod 7 as well as an annular valve body 10 that cooperates with both sealing seats 15, 16 and is guided in a guide part 21 that is arranged in the control housing 5 in sealed fashion, wherein the annular valve body is pressed against the valve seats 15, 16 by means of a valve spring 22 that is supported on the guide part 21. The operating chamber 3 can be connected to the vacuum chamber 4 by means of a channel 28 that extends laterally in the control housing 5.

The brake force is transmitted to an actuating piston of a not-shown main cylinder of the brake system which is arranged on the vacuum side of the power assist unit housing via an elastic reaction disk 6 that adjoins the end surface of the control housing 5 as well as a push rod 14 that is provided with a head flange 23.

A return spring 26 that is schematically illustrated in the figure and supported on the end wall of the power assist unit housing 1 located on the vacuum side holds the movable wall 2 in the idle position shown. In addition, a second compression spring or piston rod return spring 27 is provided. This second spring is indirectly supported on the actuating rod 7 as well as on the guide part 21, wherein the force of this second spring ensures a prestress of the valve piston 9 or its sealing seat 16, relative to the valve body 10.

In order to be able to connect the operating chamber 3 to atmosphere during the actuation of the control valve 12, a channel 29 that extends approximately radially is arranged in the control housing 5. The return movement of the valve piston 9 at the end of a braking maneuver is limited by a transverse element 11 that adjoins a limit stop 38 arranged in the power assist unit housing 1 in the separated position of the vacuum brake power assist unit shown in FIG. 1.

FIG. 1 also shows that the valve body 10 contains an annular sealing surface 44 that cooperates with both sealing seats 15, 16. This sealing surface is reinforced by means of a metal reinforcing disk 45 and is provided with several axial openings 19. In addition, the valve body 10 contains a radially inner sealing lip 13 as well as a radially outer second sealing lip 41. These sealing lips tightly adjoin the aforementioned guide part 21 which guides the valve body 10 inside of the control housing 5 in the assembled state of the valve body 10, such that a pneumatic chamber 17 is limited inside of the control housing 5. The flow channels formed by the openings 19 as well as openings in the sealing surface 44 connect the pneumatic chamber 17 to an annular chamber 43 that is limited by the sealing seats 15, 16, wherein the aforementioned pneumatic channel 29 ends in this annular chamber such that the pneumatic chamber 17 formed on the side of the valve body 10 which faces away from the sealing surface 44 is continuously connected to the operating chamber 3 and pressure compensation takes place on the valve body 10.

Consequently, the previously described arrangement allows a reduction of the difference between the response force of the brake power assist unit and the restoring force acting upon the valve piston, such that an increase in the restoring forces can be achieved at a constant response force or a reduction in the response force can be achieved at a constant restoring force, i.e., an improved hysteresis of the brake power assist unit according to the invention is attained.

In order to initiate an external actuation of the brake power assist unit according to the invention which is not a function of the actuating rod 7, a third sealing seat 24 that can be actuated by means of an electromagnet 20 is arranged radially between the first (15) and the second sealing seat 16. This electromagnet is preferably arranged in a housing 25 that is connected without rotational play to the valve piston 9, i.e., it can be displaced inside the control housing 5 together with the valve piston 9. The electromagnet 20 consists of a coil 46 arranged inside the housing 25 as well as a cylindrical armature 31 that can be axially displaced and is partially guided in a sealing part 30 that seals the housing 25. A sleeve that is connected to the aforementioned third sealing seat 24 is supported on this cylindrical armature and holds the armature 31 in its output position, a compression spring 40 is arranged between the valve piston 9 and the sleeve 32, wherein the third sealing seat 24 is axially offset relative to the second sealing seat 16 arranged on the valve piston 9, such that a gap exists between the third sealing seat 24 and the sealing surface 44 of the valve body 10. In this case, a ring 36 that preferably encompasses the sleeve 32 radially is provided. This ring is supported on the sleeve 32 by way of an elastic or compressible element 37 and axially adjoins a limit stop 51 arranged on the sleeve 32 (FIG. 2) with its other end such that the ring and the sleeve 32 can be moved relative to one another. The width of the ring 36 is chosen such that the distance between its edge region that faces the valve body 10 and the sealing surface 44 is smaller than the distance between the sealing surface 44 and the third sealing seat 24. The aforementioned edge region is provided with axial openings 39. The sealing part 30 guided in the control housing 5 adjoins the aforementioned reaction disk 6 by way of a transmission disk 33 and thus allows a transmission of the force introduced via the actuating rod 7 onto the reaction disk 6.

In the embodiment of the brake power assist unit according to the invention which is shown in the figure, electrical switching means 47, 48 are provided. These switching means are particularly important during braking maneuvers, wherein the electromagnet 20 is triggered in addition to the actuation of the brake by the driver in order to realize a full brake application independently of the drivers intentions (so-called brake assistance function). In this case, it is particularly important that the switching means 47, 48 are actuated during each braking maneuver. However, it also must be ensured that the electromagnet 20 is reliably switched off after the externally-assisted braking maneuver is completed. The switching means shown preferably consists of a microswitch 47 that has two switching positions and is arranged on the valve piston 9 or the housing 25 of the electromagnet 20, as well as an actuating element 48 that actuates the microswitch 47 in the form of a translational movement. This actuating element is guided in a bore in the control housing 5 in sealed fashion and cooperates with a limit stop rigidly arranged on the power assist unit housing. This limit stop is designated by reference numeral 49 and, for example, is formed by a radial collar of the rear power assist unit housing half. A compression spring 50 is arranged between the actuating element 48 and the control housing 5 such that the end of the actuating element 48 which faces away from the microswitch 47 adjoins the limit stop 50 under a certain prestress.

FIG. 2 shows the individual actuating phases of the control valve 12 during its external actuation by the electromagnet 20. In the home or standby position of the control valve 12 shown in FIG. 2a, the valve body 10 adjoins the first (15) as well as the second sealing seat 16 such that both chambers 3, 4 of the brake power assist unit are separated from one another and the connection between the operating chamber 3 and atmosphere is interrupted. The edge region of the ring 36 mentioned above with reference to FIG. 1 and the third sealing seat 24 are respectively situated at a distance from the sealing surface 44 of the valve body 10.

Figure 2A:
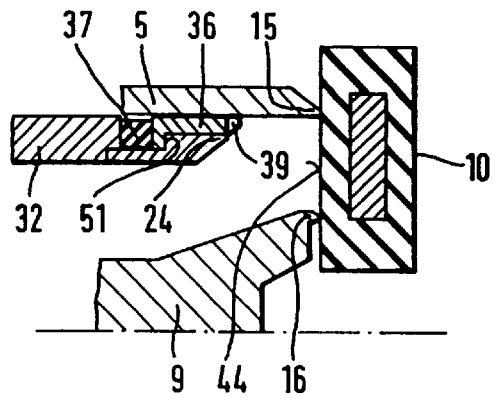
FIGS. 2a–d, enlarged representations of a first embodiment of the control valve of the brake power assist unit according to FIG. 1, namely in the home position, the pressure build-up position, the pressure maintaining position and the pressure reduction position.
Figure 2B:
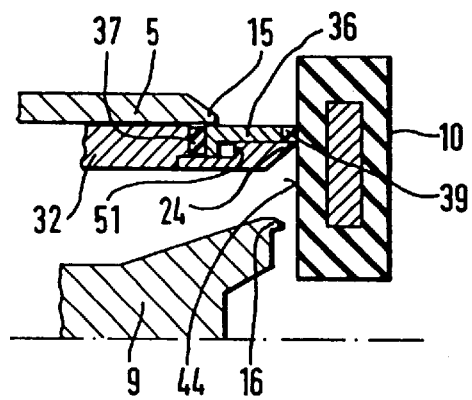

In order to reach the pressure build-up position shown in FIG. 2b, the electromagnet 20 is supplied with current such that the third sealing seat 24 and the ring 36 initially adjoin the valve body 10 while the elastic element 37 is simultaneously compressed, whereafter the third sealing seat and the ring displace the valve body 10 toward the right against the force of the valve spring 22 (FIG. 1) such that a gap is formed between the second sealing seat 16 and the valve body 10 and a ventilation of the operating chamber 3 takes place. In this case, the first sealing seat 15 takes over the function of the third sealing seat 24.

Figure 2C:
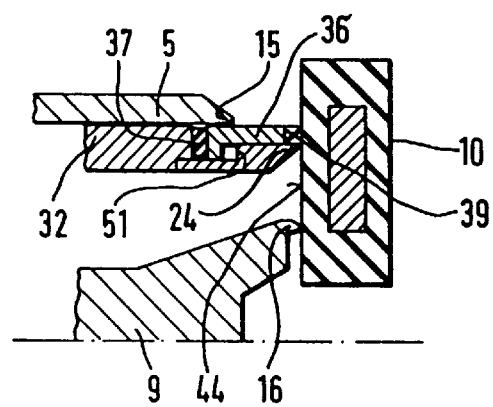

In the pressure-maintenance phase shown in FIG. 2c, the second (16) as well as the third sealing seat 24 are closed such that no changes in the pneumatic pressure built up in the power assist unit housing can occur.

Figure 2D:
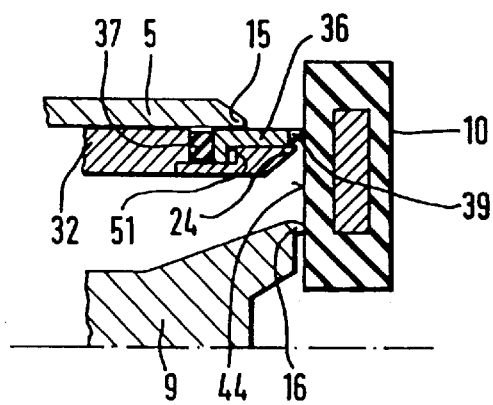

FIG. 2d shows a controlled pressure reduction phase, during which the second sealing seat 16 remains closed, the third sealing seat 24 is lifted off the sealing surface 44 and the ring 36 adjoins the sealing surface 44 with its edge region due to the prestress of the elastic element 37, i.e., a metered removal of the atmosphere from the operating chamber 3 by suction and consequently a decrease in the pneumatic pressure built up in the pneumatic brake power assist unit 1 takes place by way of the aforementioned openings 39 that are partially covered by the end region of the sleeve 32 at the beginning of the pressure build-up phase.

Figure 3:
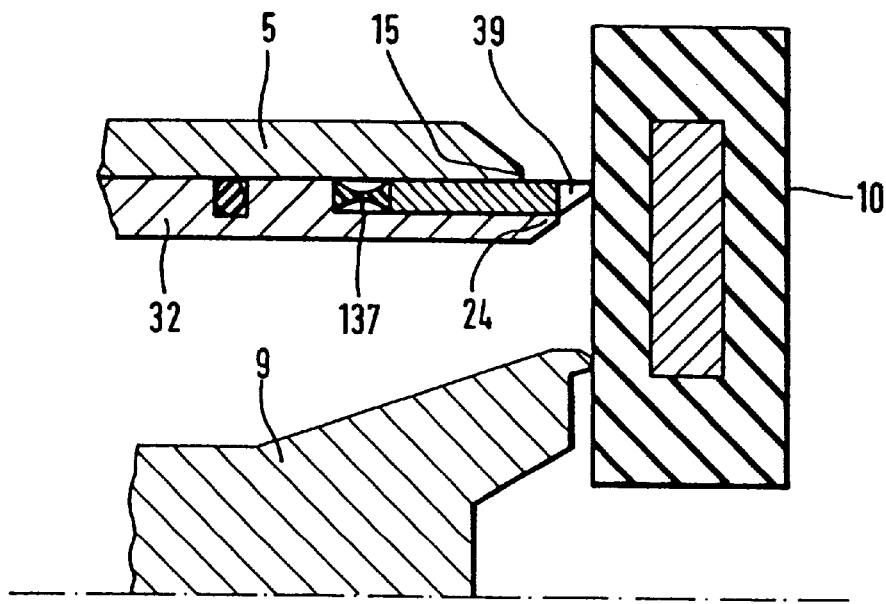
FIG. 3, a second embodiment of the control valve of the brake power assist unit according to FIG. 1 during a regulated pressure build-up.

In the second embodiment of the object of the invention which is shown in FIG. 3, an elastic element 137 is vulcanized between the sleeve 32 and the ring 36 such that the limit stop 51 mentioned above with reference to FIG. 1 or 2 can be eliminated.

Figure 4A:
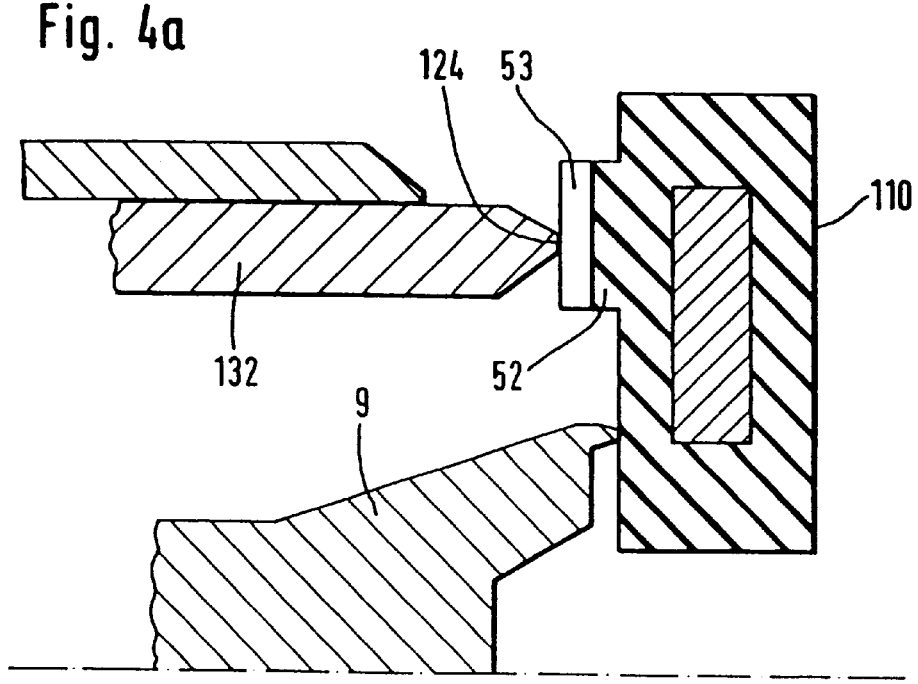
FIGS. 4a and 4b, a third and a fourth embodiment of the control valve of the brake power assist unit according to FIG. 1 during a regulated pressure build-up.

FIG. 4a shows one variation of the known sleeve 132, the sealing seat 124 of which cooperates with a modified valve body 110. Within the region in which it contacts the third sealing seat 124, the valve body 110 is provided with an additional annular surface 52 that contains radial openings 53. During the pressure build-up, these radial openings are closed because the third sealing seat 124 is pressed into the material of the valve body 110. A metered pressure reduction is achieved by continuously releasing the openings 53 during the return movement of the sleeve 132, i.e., before the third sealing seat 124 entirely releases the gap between itself and the valve body 110.

Figure 4B:
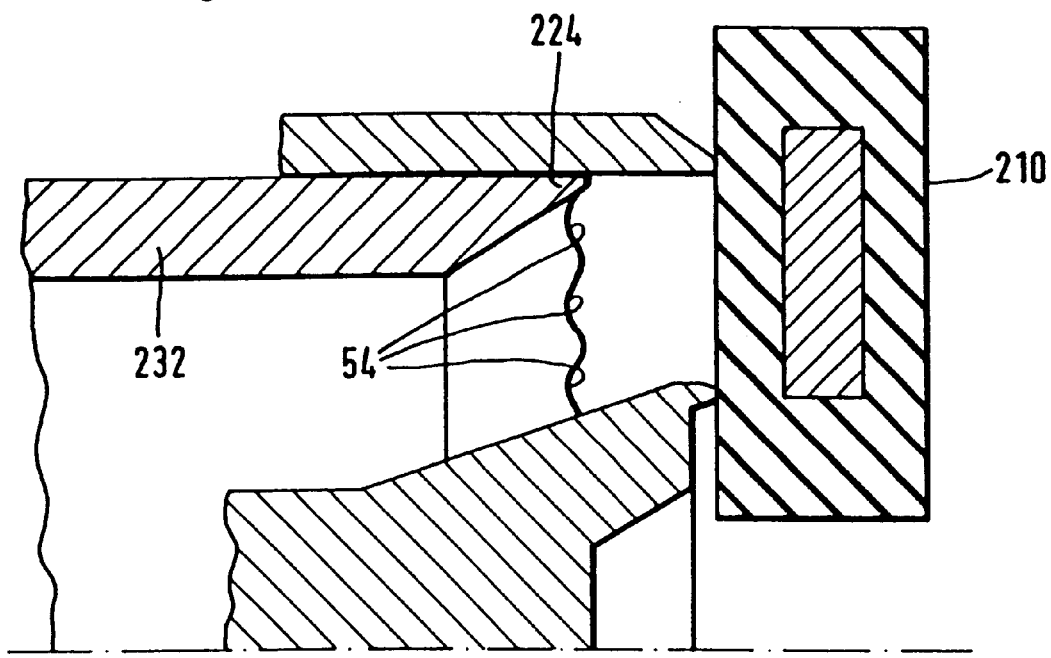

FIG. 4b shows another variation with the known sleeve 232, the edge region of which that forms the third sealing seat 224 is provided with axial recesses or depressions 54. These recesses or depressions may, for example, be realized in the form of a corrugated sealing edge as shown in the figure. When the third sealing seat 224 is pressed against the rubber material of the valve body 210, the third sealing seat 224 remains unsealed until it is pressed into the rubber material to such an extent that the axial limitation of the depressions 54 also contacts the rubber and consequently produces a tight seal. A metered pressure reduction is attained during the return movement of the sleeve 232 due to the continuous release of the depressions 54, i.e., before the third sealing seat 224 entirely releases the gap between itself and the valve body 210.

Figure 5:
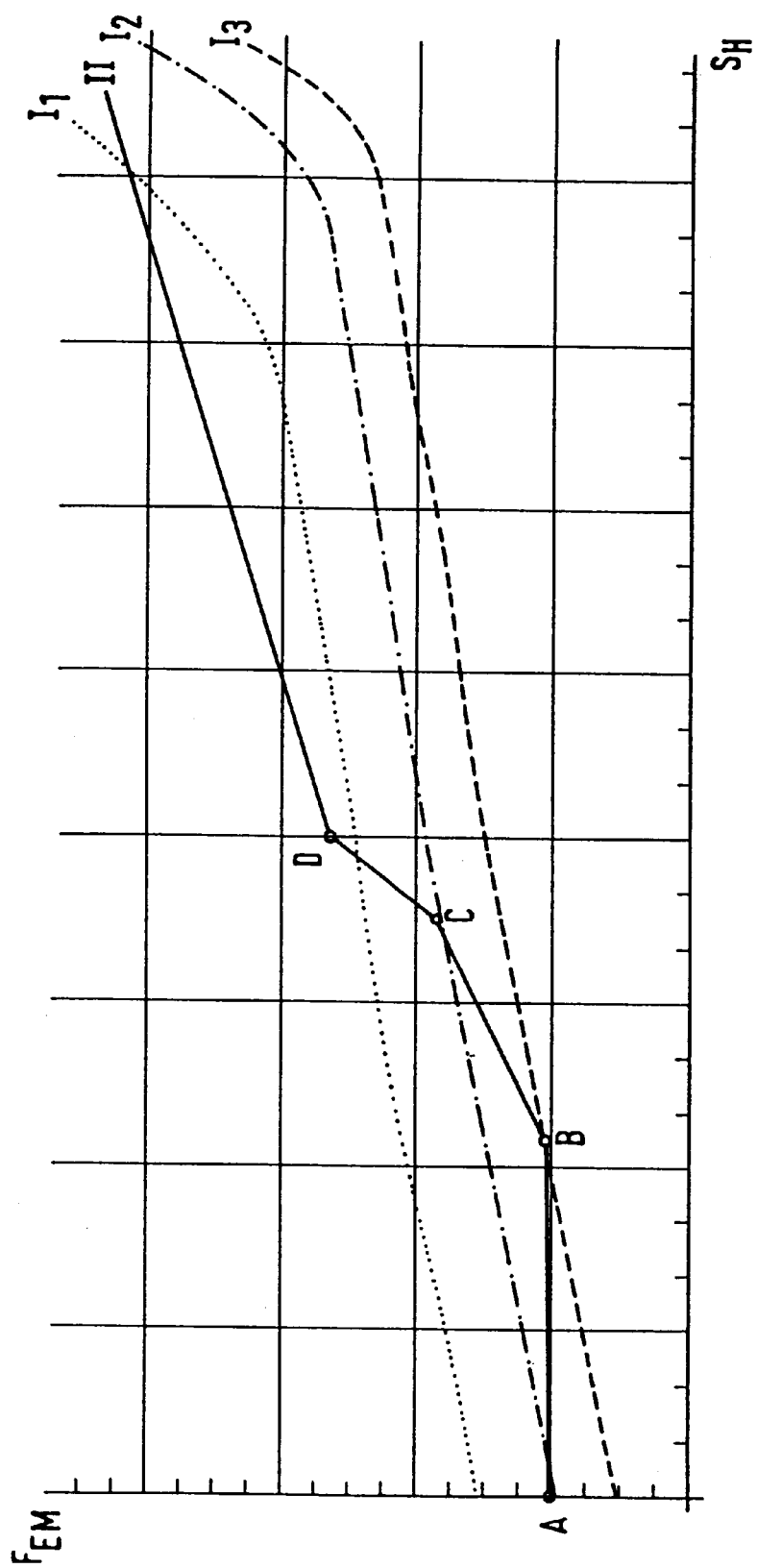
FIG. 5, a diagram that indicates the function of the electromagnet and the control valve of the brake power assist unit shown in FIG. 1 and the dependence of the force $F_{EM}$ generated by the electromagnet and the power requirement of the sleeve on the travel $S_H$ of the sleeve, respectively.

The function of the externally actuated brake power assist unit described in this patent or illustrated in the figures is explained below with reference of the diagram according to FIG. 5 which shows the force-travel characteristics. This figure shows that the plots identified by reference symbols $I_1$, $I_2$ and $I_3$ correspond to three different force-travel characteristics of the electromagnet 20 when it is triggered with a first, a second and a third current value. The plot identified by the reference symbol II represents the behavior of the load system formed by the armature 31 of the electromagnet 20, the sleeve 32, the valve body 10 and the described springs. The first section AB of the characteristic II shows the effect of the relatively weak compression spring 40 arranged between the sleeve 32 and the valve piston 9. The force of this compression spring must be overcome before the third sealing seat 24 adjoins the sealing surfaces 44 of the valve body 10. The second section BC shows the increase in the force to be generated by the electromagnet 20 in order to press the edge region of the ring 36 into the material of the sealing surface 44 until the third sealing seat 24 and the sealing surface 44 of the valve body 10 can contact one another in point C, in which the characteristic II intersects the plot 12. In the third section CD, the edge region of the ring 36 as well as the third sealing seat 24 are pressed into the sealing surface 44 while simultaneously displacing the valve body 10 against the force of the spring 22 until the second sealing seat 16 is opened and the pressure build-up begins in point D. During the additional displacement of the sleeve 32, a defined gap between the second sealing seat 16 and the sealing surfaces 44 of the valve body 10, and consequently a defined gradient of the pneumatic pressure in the operating chamber 3, is adjusted. Once a desired pressure value is reached, the current supplied to the electromagnet 20 is lowered such that the sleeve 32 is moved back. In the section DC, in which the current supplied to the electromagnet 20 is, for example, lowered to the value $I_1$, and the second (16) and the third sealing seat 24 are closed, the pneumatic pressure maintaining phase shown in FIG. 2c takes place. If the current is further lowered to the value $I_2$, the sleeve 32 and the ring 36 are moved further back until a pressure reduction (FIG. 2d) is initiated. If the current is further lowered, e.g., to the value $I_3$, the distance between the third sealing seat 24 and the sealing surface 44 becomes larger in the section CB, wherein the edge region of the ring 36 adjoins the sealing surface 44 under the influence of the elastic element 37. The section CB corresponds to a range in which the load system can be adjusted in stable fashion by changing the current supplied to the electromagnet 20 between $I_2$ and $I_3$, i.e., a range in which a defined gap between the third sealing seat 24 and the sealing surface 44 of the valve body 10 can be adjusted via the edge region of the ring 36 and a defined gradient of the pneumatic pressure in the operating chamber 3 can be adjusted. In this section, the load characteristic II shows a steeper increase than the force-travel characteristic of the electromagnet 20 between the current values $I_2$ and $I_3$. The point B, in which the force-travel characteristic I3 intersects the load characteristic II and in which the edge region of the ring 36 is lifted off the sealing surface 44 of the valve body 10 simultaneously represents the transition between the stable range and an unstable range BA.

What is claimed is:

1. Brake power assist unit for motor vehicles, comprising:
  a power assist unit housing, the interior of which is divided into a vacuum chamber and a operating chamber by means of a movable wall, and with a control housing that carries the movable wall,
  a control valve that controls a pneumatic differential pressure acting on the movable wall is arranged in the aforementioned control housing, wherein the control valve is actuated by an actuating rod by way of a valve piston as well as independently of the actuating rod by means of an electromagnet that is connected without rotational play to the valve piston, wherein the control valve consists of three sealing seats that are arranged mutually concentrically as well as a valve body that cooperates with the sealing seats, and wherein the first sealing seat is arranged in the control housing, the second sealing seat is arranged on the valve piston, and the third sealing seat is arranged on a sleeve that cooperates with the electromagnet,
  means for controlling pneumatic pressure compensation between the operating chamber and the vacuum chamber during a pressure reduction phase said controlling means including a ring that is displaceable relative to the third sealing seat, wherein said ring is supported on the sleeve by way of an elastic or compressible element, and wherein an edge region of said ring which faces the valve body is provided with radial openings and is arranged axially offset relative to the third sealing seat.

2. Brake power assist unit according to claim 1, wherein ring radially encompasses the third sealing seat.

3. Brake power assist unit according to claim 1, wherein ring adjoins a limit stop arranged on the sleeve.

4. Brake power assist unit according to claim 1, wherein the elastic element is vulcanized onto the sleeve as well as onto the ring.

5. Brake power assist unit for motor vehicles, comprising:
  a power assist unit housing, the interior of which is divided into a vacuum chamber and a operating chamber by means of a movable wall, and with a control housing that carries the movable wall,
  a control valve that controls a pneumatic differential pressure acting on the movable wall is arranged in the aforementioned control housing, wherein the control valve is actuated by an actuating rod by way of a valve piston as well as independently of the actuating rod by means of an electromagnet that is connected without rotational play to the valve piston, wherein the control valve consists of three sealing seats that are arranged mutually concentrically as well as a valve body that cooperates with the sealing seats, and wherein the first sealing seat is arranged in the control housing, the second sealing seat is arranged on the valve piston, and the third scaling seat is arranged on a sleeve that cooperates with the electromagnet, means for controlling pneumatic pressure compensation between the operating chamber and the vacuum chamber during a pressure reduction phase wherein the third sealing seat is provided with axial recesses.

6. Brake power assist unit according to claim 5, wherein the third scaling seat contains a corrugated sealing edge.

* * * * *